United States Patent

[11] 3,631,716

[72] Inventor Freydoun Monajjem
 Mayfield, Ky.
[21] Appl. No. 12,008
[22] Filed Feb. 17, 1970
[45] Patented Jan. 4, 1972
[73] Assignee The General Tire & Rubber Company

[54] FORCE VARIATION MARKER FOR TIRES
 6 Claims, 5 Drawing Figs.
[52] U.S. Cl. ............................................. 73/146
[51] Int. Cl. ....................................... G01m 17/02
[50] Field of Search ................................. 73/146

[56] References Cited
 UNITED STATES PATENTS
 3,518,878 7/1970 Landsness ............... 73/146
 3,500,681 3/1970 Shively .................... 73/146

Primary Examiner—Donald O. Woodiel
Attorneys—Frank C. Rote, Jr. and Harry F. Pepper, Jr.

ABSTRACT: A marking pen or similar marking device is used to mark a rotating tire to indicate the location at which a given force variation, as measured by a tire uniformity machine, is generated. As the tire is rotating against the load drum of a uniformity machine, the point on the tire at which this force variation is produced passes beneath the marker at which time a solenoid is activated to abruptly move the maker toward the sidewall of the tire and to cause the marker to mark the tire with a suitable marking fluid such as ink. The abrupt movement of the marker causes it to eject a small amount of the marking fluid and to deposit the fluid on the tire sidewall. To protect the marker from damage in the event that it comes into contact with the rotating tire, the marker is mounted on a carriage that is pivotally held in a support whereby the frictional contact between the marker and tire will cause the marker to move in the direction of movement of the tire in an arcuate path that carries it away from the tire. The marker solenoid is operated by a very simple relay circuit activated by a signal from the tire uniformity machine.

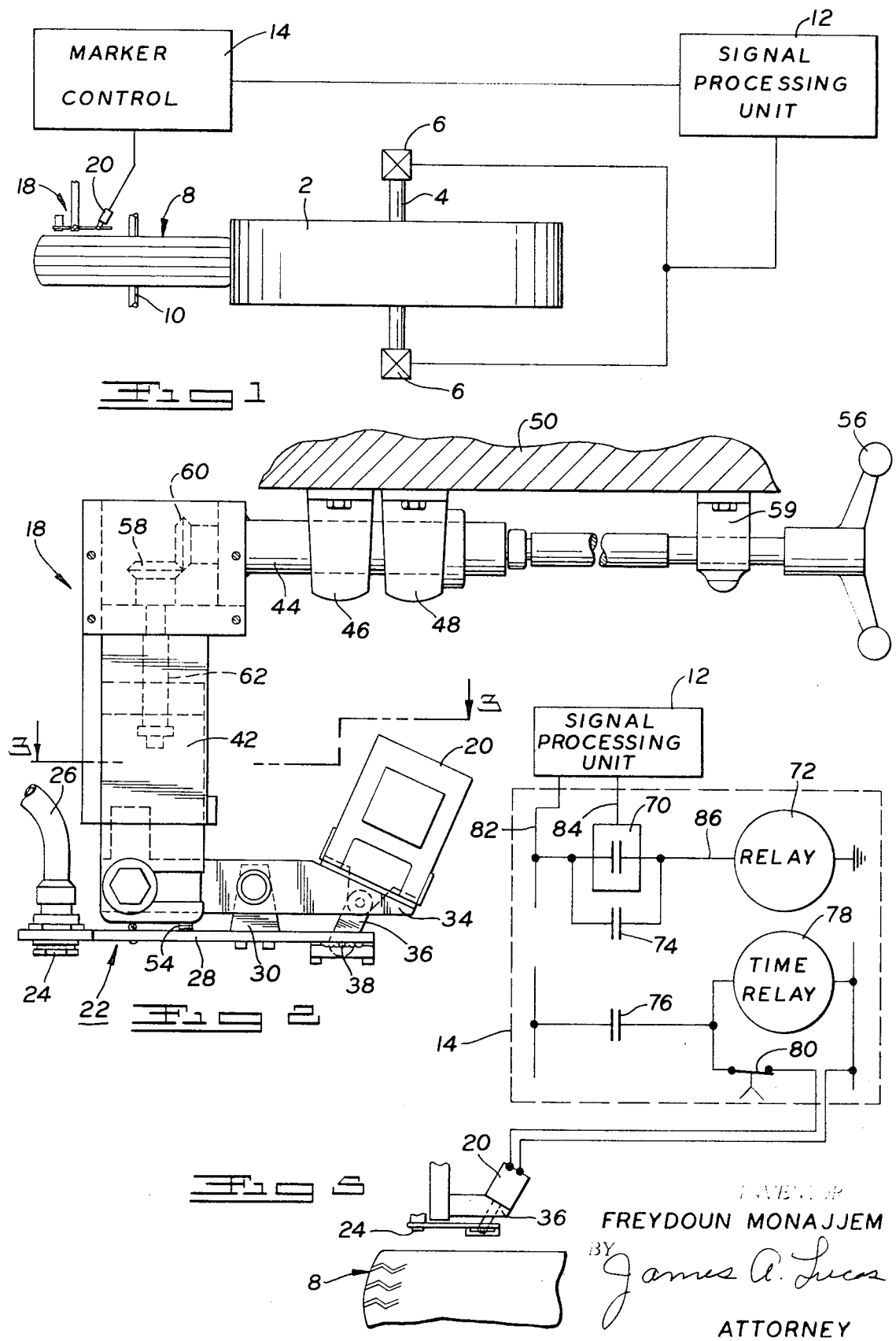

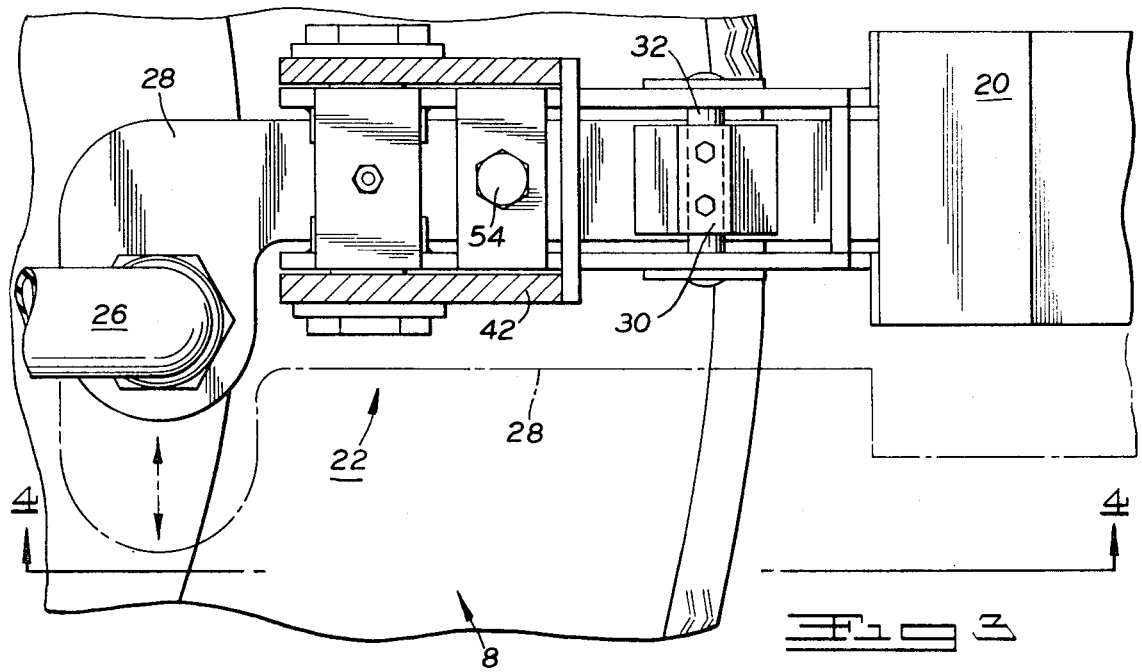
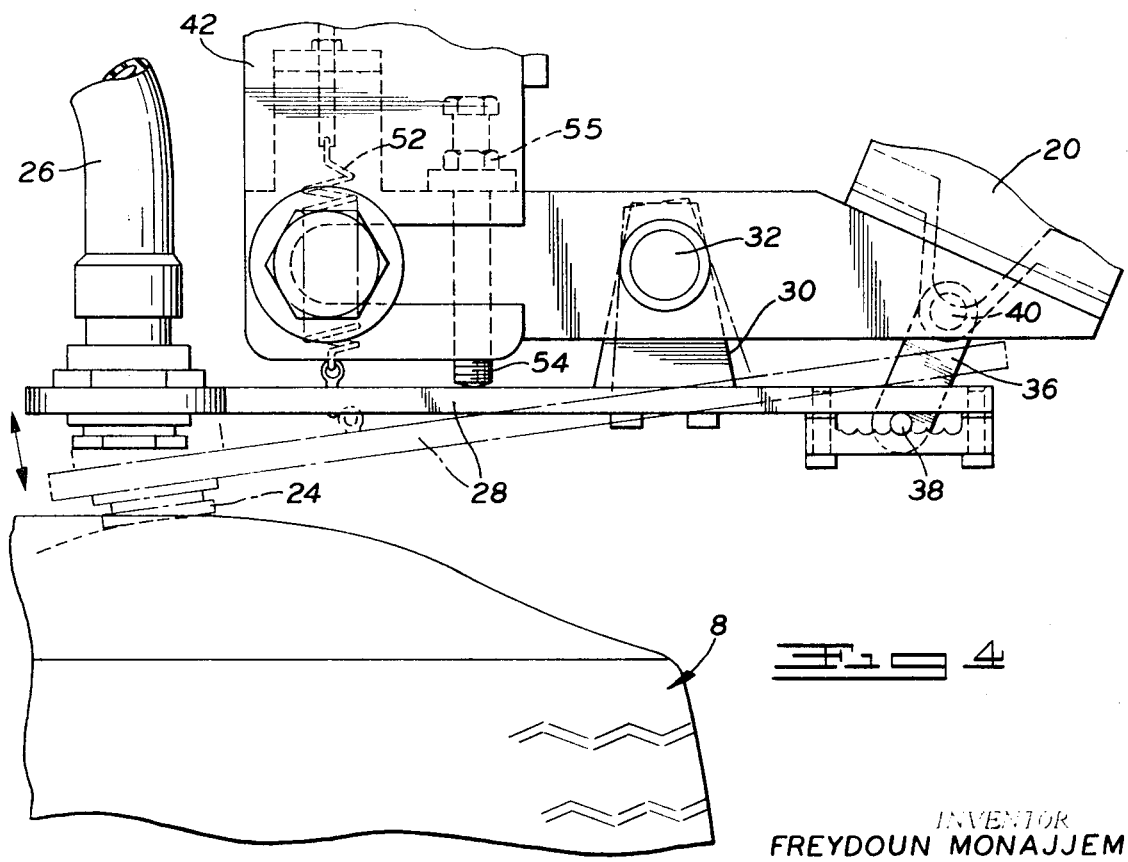

3,631,716

FORCE VARIATION MARKER FOR TIRES

BACKGROUND OF THE INVENTION

In recent years the measurement of dynamically induced force variations generated by a tire has become a significant and important tool for the tire manufacturer in his efforts to produce better and smoother running tires. These force variations can be attributed to one or more factors in the tire such as splice variations, dimensional irregularities in the calendered fabric used for the carcass, breaker and other parts of the tire, and other deviations that are introduced into a tire due to human or mechanical errors during construction. These force variations are measured by rotating the tire against a road drum at a constant speed and under a predetermined static load. During rotation, the distance between the tire axis and the drum shaft are fixed. This drum shaft is supported on load cells or transducers which measure the load exerted by the tire against the drum and which are capable of sensing minute variations in the exerted force during rotation of the tire. These load cells are capable of separately measuring radial forces, which are the forces exerted against the drum at right angles thereto, and lateral forces which are forces exerted against the drum parallel to the drum axis. The force variations are converted to electrical impulses which can be displayed as a force variation curve on a suitable readout device such as an oscilloscope. The general pattern of the curve repeats itself for each revolution of the tire. This force variation curve is the composite of the first and many higher order harmonic frequencies that are dynamically developed while the tire is rolling. The composite curve is charactertized by a peak representing the greatest deviation from the static load. It has been discovered that there is a direct correlation between the magnitude of the maximum radial force variation, and the riding characteristics of the tire. As the force variation increases, the tire typically gives an increasingly rougher ride.

Until recently, the measurement of force variation was merely used as an analytical tool. However, it has recently been found that the magnitude of the radial force variation can be reduced by the removal of a small amount of rubber from the shoulder ribs of the tire at the location in the tire at which the force variation is generated. This development is more fully described in pending application Ser. No. 613,252 entitled "Means for Correcting Nonuniformity in Tires," assigned to the assignee of the present invention.

Attempts have been made to mount tires on rims so as to balance the effect of the maximum radial force variation in the tire with the corresponding deviation in the rim. Furthermore, machines have been developed for measuring the radial force variation of the tire and then automatically correcting the tire. Whether or not the tire is to be corrected while in the tire uniformity machine, it is a common practice to mark the sidewall of the tire to indicate the location where the maximum force variation is generated. Prior to the present invention, this marking was achieved by mounting a marker on the tire uniformity machine in proximity to the tire. As the tire was rotated, the force variation around the tire was measured, and the maximum force variation was noted and correlated with a specific location on the tire. The tire was then brought to a standstill and, with a suitable servo motor, was moved back and forth into exact position beneath the marker using a null point potentiometer after which a solenoid valve was activated to move an ink pen or other suitable marking device into contact with the sidewall. After that, the tire was removed from the machine. The process of stopping the tire in the machine and moving it back and forth utilizing servo motors and potentiometers was both expensive and time consuming.

SUMMARY OF THE INVENTION

A principal object of the present invention is a means for marking the location of maximum radial force variation in a tire while it is rotating in the uniformity measuring machine.

Another object is to eliminate the necessity of bringing the tire to a standstill while in the uniformity machine, thus dispensing with the electrical circuitry and hardware used for that purpose.

Still another object is a considerable savings in time for a complete tire uniformity measurement cycle.

Yet another object is to reduce the errors associated with prior marking methods and devices.

These and other objects are accomplished in the manner to be hereinafter described with reference to the drawings in which;

FIG. 1 is a block schematic view of a tire uniformity machine including control circuitry for the tire marker;

FIG. 2 is an elevational view, partially in cross section, showing details of the tire marker;

FIG. 3 is a view taken along lines 3—3 of FIG. 2 showing further details of the marker assembly;

FIG. 4 is a view taken generally along lines 4—4 of FIG. 3; and

FIG. 5 is a simplified schematic view of the electrical circuitry for the marker control.

The present invention relates to an improved method and apparatus for marking a rotating tire to show the location within the tire at which a given force variation is generated, and comprises a method and apparatus for noting the location wherein said force variation is generated, moving the marker towards the sidewall of the rotating tire at said location, and retracting the marker after the tire has been marked.

Referring now to the drawings, FIG. 1 is a simplified view showing the basic structural features of a tire uniformity machine. This machine contains a metal drum 2 adapted to rotate on shaft 4 the ends of which are supported in suitable load cells or transducers 6 of well known construction. A pneumatic tire 8 is mounted on a pair of rims (not shown) and is inflated after which it is statically loaded against a drum while being rotated about axle 10. After the predetermined static load is applied, the shaft 4 and axle 10 are locked so that the distance between them remains fixed. As the tire rotates against the freely turning drum, slight variations from the applied static load, caused by the above-mentioned structural aberrations in the tire, are detected by the load cells 6. These variations are transformed into an electrical output signal which is then integrated and is sent to a signal processing unit 12. For purposes of the present invention, the signal processing unit amplifies and conditions the signal so that it may be fed to the marker control 14. It should be understood, however, that the signal processing unit is in fact composed of many mechanical and electrical elements including programmers, signal conditioners, memory devices, readout or recording devices and other functional components, typically found in commercial tire uniformity measuring machines.

The processed signal is sent from the processing unit 12 to the marker control 14 which activates the solenoid 20 of the marker 18. The marker is normally positioned between 90° and 270° away from the footprint area of the tire and drum. Accordingly, there must be a pause between the time the load cells detect the maximum force variation and the time the location of this force variation reaches the marker position. Accordingly, the signal is stored in the processing unit 12 or the marker control 14 until the appropriate time interval has elapsed. For example, if the tire is rotating at a speed of 1 revolution per second and the marker is placed 180° away from the footprint area, a 0.5 second time delay is required before activation of the solenoid.

FIG. 2 is a closeup of a marker similar to the one sold by ASM Corporation as part of their Model 60 tire uniformity machine, but modified by the teachings of the present invention to achieve the objects hereinbefore stated. The marker 18 comprises a marking assembly 11 including a marking head 24 joined by a flexible hose 26 to a source of ink or other marking fluid. The marking head 24 is mounted on one end of a marker arm 28 which in turn is joined to a pivot arm 30 supported on pivot pin 32. The solenoid 20 is mounted on a support 34 and is joined by a linkage 36 and a pair of pins 38, 40 to the end of the marker arm opposite the end containing the marking head 24. The solenoid support 34 comprises a part of the marker carriage 42 which includes a shaft 44 secured in a pair of pillow blocks 46, 48 bolted or otherwise secured to the frame 50 of the tire uniformity machine. One end of a tension spring 52 is joined to the marker arm 28 between the marking head 24 and pivot arm 30 while the other end of the spring 52 is joined to the carriage 42. This is clearly shown in FIG. 4. An adjustment bolt 54 and nut 55 are used to limit the distance that the marker arm 28 moves to its retracted position when not in use. The marker carriage 42 is provided with suitable adjustment means including handle 56 mounted in a support bearing 59, a pair of miter gears 58, 60 and an adjustment screw 62 for moving the marker assembly in a direction parallel to the tire axis. This adjustment permits the marker to be used on different tires having different widths and profiles.

As previously mentioned, the carriage shaft 44 is mounted in pillow blocks 46, 48 permitting the shaft 44 and the entire carriage to rotate or pivot within the pillow blocks. When the solenoid 20 is energized, the plunger 36 moves into the solenoid causing arm 28 to pivot about pin 32 thereby abruptly lowering the marker head 24 through an arcuate path towards the rotating tire. This path is substantially perpendicular to the midcircumferential plane or "plane of rotation" of the tire 8. This can be seen more clearly in FIG. 4. If the marking head 24 contacts the tire moving at right angles thereto, the frictional contact between the head and the tire causes the carriage 42 and the marking assembly to be swung in an arc with shaft 44 as the center, until the path of the arc causes the marker to move out of contact with the tire. This latter arcuate path lies in a plane substantially perpendicular to the plane of the former arcuate path transcribed by marking head 24. This movement is shown in dotted outline in FIG. 3. By then a timed relay, activated upon closing of the solenoid, completes a cycle thereby deactivating the solenoid. When this occurs, the spring 52 biases the marker arm 28 to its normal rest position against adjustment bolt 54. Even though the marker head may not always contact the tire, the solenoid operates very quickly thereby causing the marker head to eject or flip a drop of marking fluid onto the tire.

Although the mark can be placed on the shoulder or tread of the tire at the location of the force variation to be marked, the sidewall is the most convenient place to be marked. Accordingly, the marker is mounted on the machine in a position and location that permits the marking head, when moved by the solenoid, to move through an arcuate path disposed in a plane substantially perpendicular to the plane of rotation of tire 8 and to deposit the marking fluid on the tire sidewall, and to freely move in the direction that the tire is moving. Thus, the shaft of the marker carriage, around which the marking head rotates, must be positioned, relative to the tire and its axis of rotation, to permit such rotation upon contact with the tire. Generally, for best results, this shaft will lie in a plane that includes the axis of the rotating tire, and the shaft will be at right angles to the tire axis. In this position, the marker swings through an arc that is parallel to the direction of movement of the tire at the point of contact. Of course, the marker can be located at any other position with respect to the tire so long as one component of the angular movement of the tire sidewall, at the point of marking, is in the same direction as the tire marker thereby minimizing the possibility of damage to the marker.

FIG. 5 is a simplified schematic diagram of the circuitry used to control the solenoid 20 and the marking operation. The signal processing unit 12 detects a given force variation that is generated by the rotating tire and correlates this variation with the specific location in the tire at which the given variation is generated. The given force variation will normally be the maximum force variation which has been found to be a significant contributor to a rough riding tire.

At the appropriate time, the signal processing unit 12 sends a pulse signal to the marker control 14, closing contact 70. Closing of this contact activates the coils of relay 72. This relay mechanically closes contacts 74 and 76. When contact 76 is closed, it activates timer relay 78 and energizes the solenoid 20, causing the plunger 36 to move the marking head abruptly toward the tire 8 to mark the same. When the timer relay, which is set, for example at 50 milliseconds, times out, switch 80 opens thereby deenergizing the solenoid circuit and permitting the marker arm to return to its normal rest position.

In order to permit a more complete understanding of the subject invention, the following example is used to illustrate the advantages and savings in time obtained through the use of the present improvement on a tire uniformity machine.

An 8.25 ×14 four-ply nylon tire is mounted on the rim of an ASM Model 60 uniformity machine that is not equipped with the improved marking system of the present invention. The tire is inflated to 28 p.s.i. and is loaded against a 30 inch diameter drum at a static load of 1,200 lbs. pressure. It is rotated at 60 r.p.m. for 1 to 5 seconds for warm up, after which the radial force variations are measured. The test is conducted at room temperature. The tire is then brought to a stop and is positioned with a servo motor and a null point potentiometer so that the location of the tire in which the maximum force variation is generated is located beneath the marker. The tire is then marked, deflated and removed from the machine. The entire operation requires a total elapsed time of about 40 seconds.

Following the same procedure, but utilizing the teachings of the present invention, the location of the maximum force variation is marked while the tire is rotating at 60 r.p.m. The rotating tire is then removed from the machine. The total elapsed time is about 30 seconds for this procedure. Accordingly, it can be seen that the new improved procedure results in about a 25 percent savings in time.

It should be understood that various changes can be made in the teachings of the present invention without deviating from the scope thereof. For example any type of marker capable of placing a visible mark on a tire can be used. Furthermore, as previously stated, various constructional details of the marker can be altered or eliminated or replaced as long as these changes do not effect the capability of the marker in accomplishing its desired function. Furthermore, the electrical circuitry for the marker can be changed by the replacement of one or more components with their equivalent.

I claim:

1. A tire marking device for marking a rotating tire in a tire test machine comprising a marking assembly including:
   1. A pivotally mounted marking arm,
   2. A marking head at the end of said arm,
   3. A solenoid connected to said arm and adapted, when activated, to pivot said arm and move said head toward the sidewall of said tire through a first arcuate path disposed in a plane substantially perpendicular to the plane of rotation of said tire,
   4. A carriage supporting said marker, and
   5. A support for said carriage having means to permit said carriage to pivot through a second arcuate path disposed in a plane substantially perpendicular to said plane of said first arcuate path when said marker head contacts said tire.

2. The device as defined in claim 1 wherein said support for said carriage includes a shaft disposed within bearing surfaces such that said carriage pivots about said shaft when said marking head contacts said tire.

3. The device as defined in claim 2 wherein said shaft is substantially perpendicular to the axis of rotation of said tire.

4. The device as defined in claim 1 further comprising a first relay for activating said solenoid to mark said tire and a second relay for deactivating said solenoid at the end of a given interval of time after activation by said first relay.

5. The device as defined in claim 2 further comprising a first relay for activating said solenoid to mark said tire and a second relay for deactivating said solenoid at the end of a given interval of time after activation by said first relay.

6. The device as defined in claim 3 further comprising a first relay for activating said solenoid to mark said tire and a second relay for deactivating said solenoid at the end of a given interval of time after activation by said first relay.

* * * * *

PO-1050
(5/69)

UNITED STATES PATENT OFFICE
CERTIFICATE OF CORRECTION

Patent No. 3,631,716     Dated January 4, 1972

Inventor(s)  Freydoun Monajjem

It is certified that error appears in the above-identified patent and that said Letters Patent are hereby corrected as shown below:

Column 2, line 69, the phrase "assembly 11" should read
-- assembly 22 --.
Column 3, lines 61-62, the phrase "as the tire marker thereby minimizing ..." should read -- as the tire marker about its axis in which event the marker will move with the tire thereby minimizing ... --.

Signed and sealed this 23rd day of May 1972.

(SEAL)
Attest:

EDWARD M. FLETCHER, JR.
Attesting Officer

ROBERT GOTTSCHALK
Commissioner of Patents